Sept. 2, 1924.  H. A. WAGNER  1,506,794
VEHICLE CONTROLLING MECHANISM
Filed March 4, 1920   2 Sheets-Sheet 1
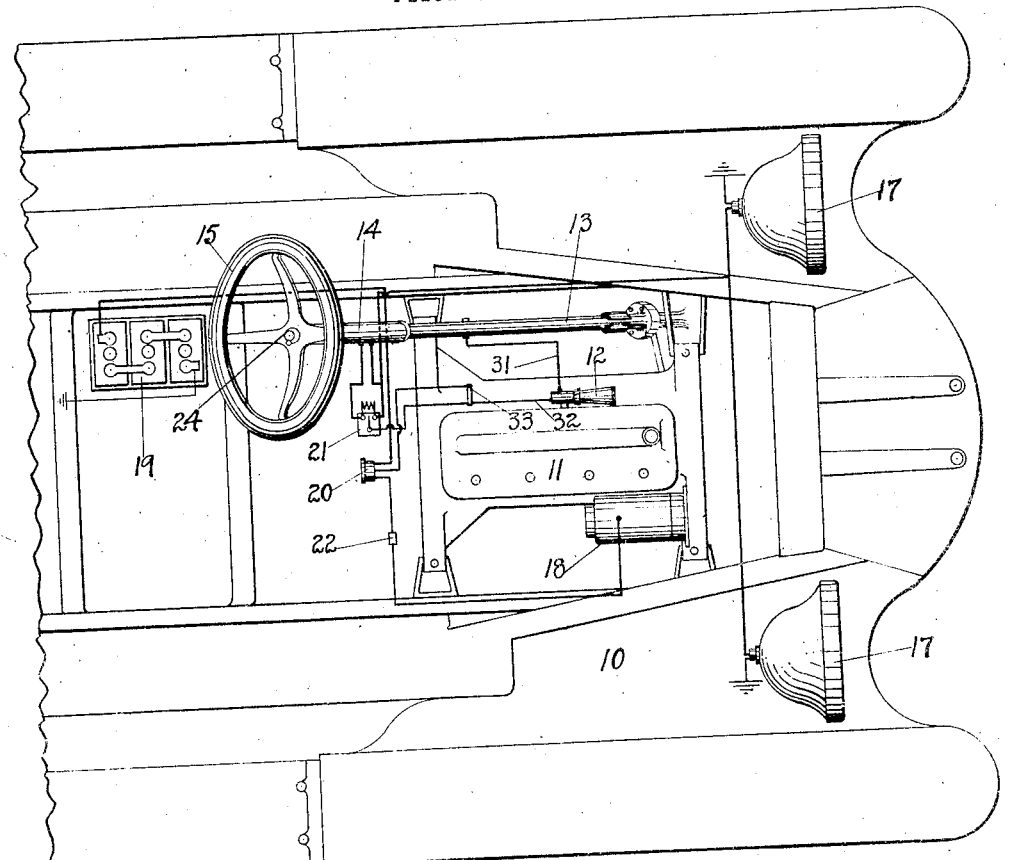
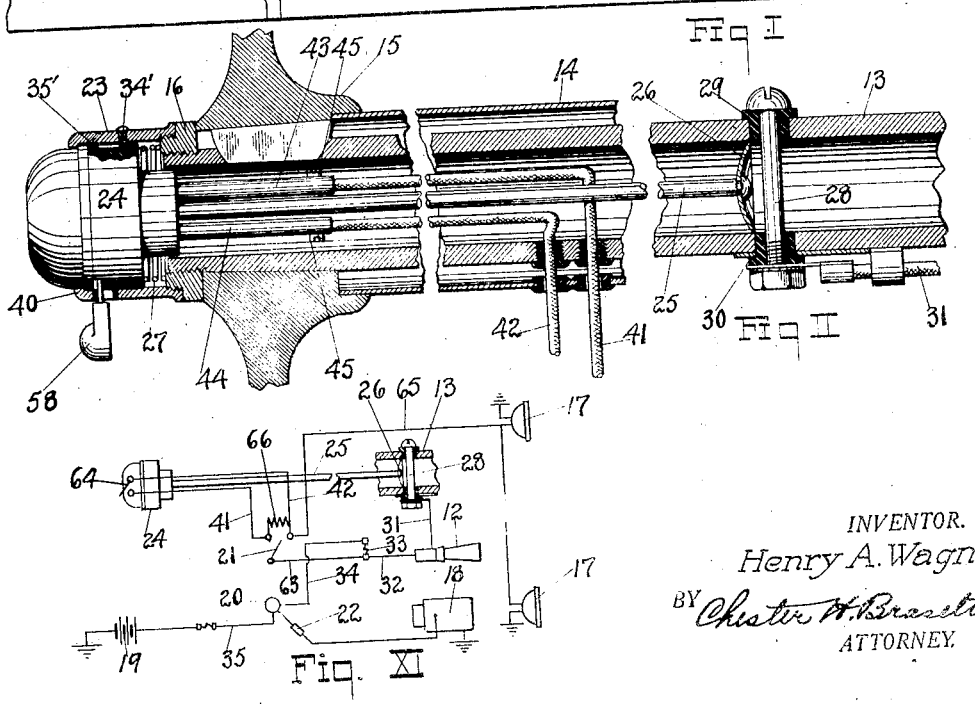
INVENTOR.
Henry A. Wagner.
BY Chester W. Braselton
ATTORNEY.

Sept. 2, 1924.     H. A. WAGNER     1,506,794
VEHICLE CONTROLLING MECHANISM
Filed March 4, 1920     2 Sheets-Sheet 2
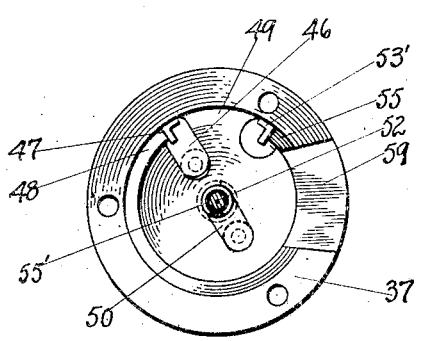
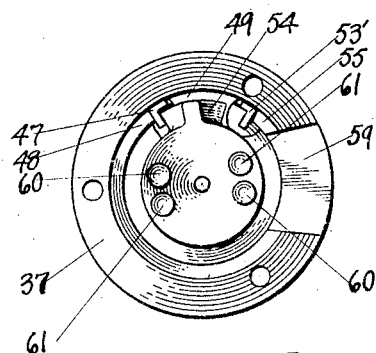
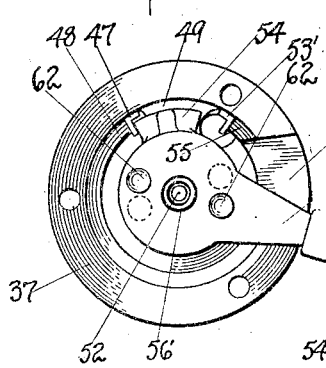
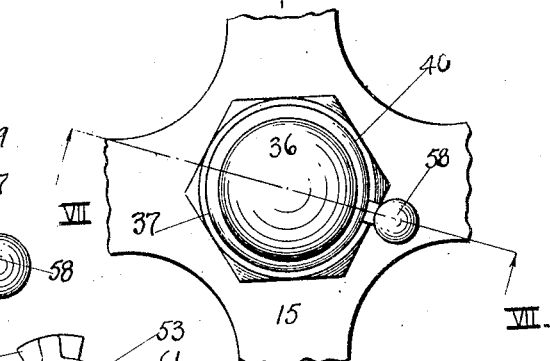
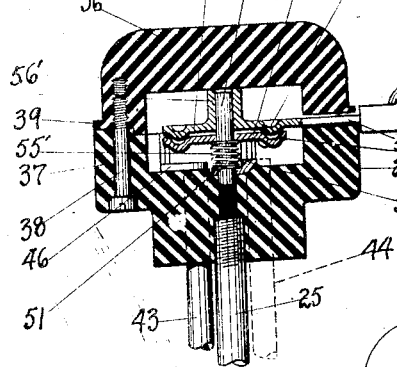
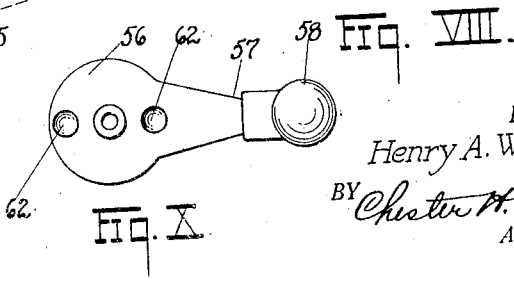
INVENTOR.
Henry A. Wagner.
BY Chester H. Braselton
ATTORNEY.

Patented Sept. 2, 1924.

1,506,794

UNITED STATES PATENT OFFICE.

HENRY A. WAGNER, OF TOLEDO, OHIO.

VEHICLE CONTROLLING MECHANISM.

Application filed March 4, 1920. Serial No. 363,279.

*To all whom it may concern:*

Be it known that I, HENRY A. WAGNER, residing at Toledo, county of Lucas, State of Ohio, have invented certain new and useful Improvements in Vehicle Controlling Mechanism, of which I declare the following to be a full, clear, and exact description.

My invention relates to vehicle controlling mechanism and has for its object the combining of certain parts of said mechanism in such a manner as to afford manipulation of the same by the operator with the least possible inconvenience.

Another object of the invention is to provide improved means for controlling the electric lights of an automobile.

Still another object of the invention is to combine means for controlling both the electric light and the signaling circuits of a motor vehicle.

Another object of the invention is to provide an improved form of switch in which one circuit controlling member is carried by another.

Still another object of the invention is to provide in combination with the push button, a switch for controlling certain electric circuits of the motor vehicle.

Another object of the invention is to provide, within the horn button of the vehicle, a switch for controlling the headlight circuit to vary the intensity of the light.

Still another object of the invention is to construct a member for securing the steering wheel upon the steering column in such a manner as to form a housing both for the horn button of the vehicle and the switch for the dimming of the headlights.

To these and other ends, the invention contemplates certain novel features of construction and arrangement of parts, which will be hereinafter pointed out and claimed, it being understood that the present embodiment is merely illustrative of one form which the invention may take and that other forms may be developed embodying the principles set forth herein without departing from the scope of the invention when considered in its broadest aspect.

A construction constituting one embodiment of the invention is illustrated in the accompanying drawings in which:

Figure I is a plan view of a motor vehicle upon which is illustrated in conventional or diagrammatic form, one embodiment of the invention.

Figure II is a fragmentary sectional view through the steering column, illustrating the manner of applying certain parts of the invention thereto.

Figure III is a detailed plan of the base of the push button with the operating parts removed therefrom.

Figure IV is a similar view with the contact disc shown in normal position to close the switch.

Figure V is a plan view similar to Figure IV showing the switch operating lever assembled and secured upon the contact disc.

Figure VI is a top plan view of the push button and a portion of the steering wheel.

Figure VII is a sectional view taken on line VII—VII of Figure VI.

Figure VIII is a view similar to Figure V with the switch shown in open position.

Figure IX is a detail plan of the contact disc shown in Figure IV.

Figure X is a detail plan of the switch operating lever.

Figure XI illustrates the wiring diagram of the signal and head light circuits of the automobile.

Similar reference numerals refer to corresponding parts throughout the several figures of the drawing.

In the embodiment of the invention illustrated herewith 10 represents an automobile having an engine 11 upon which is preferably mounted a horn or signal 12. A steering column 13 has its upper end enclosed in a tubular member 14 upon which rests a steering wheel 15, through which extends the steering column, said wheel being secured upon the column by means of a retaining nut or member 16.

The automobile is provided with a suitable lighting system, including the headlights 17 and also with a generator 18, a battery 19, a current indicator 20, lamp switch 21 and circuit breaker 22; and may be supplied with all other electrical appliances and fixtures deemed necessary, which are not shown in the drawings.

The retaining nut 16 for the steering wheel 15 is provided with an extension 23 forming a housing for the push button 24 from which extends downwardly into the steering column a rod 25 having at its lower end a switch or contact member 26, preferably in the form of a disc, the diameter of which is substantially equal to the inner diameter of the steering column 13. Between the push button 24 and retaining nut 16 is a spring 27, normally holding the contact member 26 out of engagement with the bolt 28 extending through the steering column, with its opposite ends secured upon the insulating members 29 and 30, which are anchored in the wall of the steering column as shown in Figure II. A wire or connection 31 leads from the contact member or bolt 28 to the horn 12 and when the push button 24 is depressed so that the disc 26 engages the bolt 28 the signal circuit will be closed, the circuit being completed through the steering column, and battery, both of which are preferably grounded on the frame of the automobile and through connection 31, horn 12, wire 32, fuse 33, wire 34, current indicator 20, and wire 35.

The push button is guided in the housing 23 by means of a set screw 34' projecting into a slot 35' formed in the lower part of the push button as shown in Figure II.

The push button which is formed of insulating material comprises the upper and lower portions 36, 37 respectively which are connected by means of the screws 38 as shown in Figure VII. The upper portion 36 is provided with an annular flange or shoulder 39 engaged by the inturned flange 40 of the housing 23 whereby outward displacement of the button is prevented.

The push button forms a casing in which is mounted the dimming switch for the electric lights as shown in Figure VII. Two wires or connections 41 and 42 lead from the lamp switch 21 through the steering column casing 14 into the steering column 13 and upwardly into the short tubular members 43 and 44 respectively where they are secured by the binding screws 45. The tubular member 43 extends upwardly through and into the lower portion 37 of the push button and is provided with a laterally extending horizontal portion 46, having an upstanding contact member 47 seated against an abutment or shoulder 48 formed by cutting away a portion of the inner wall of the lower push button member 37 whereby a recess 49 is formed, for a purpose which will presently be described. The tubular member 44 also extends upwardly through the base of the push button and is provided with a lateral and inwardly extending contact portion 50 which is preferably depressed at its extremity as indicated at 51 in Figure VII, said depressed portion being seated in a recess formed in the base of the push button and having mounted thereon the upstanding pin or projection 52 upon which is rotatably mounted the contact disc 53, having the lateral segmental projection 54 adapted to move within the recess 49 when the switch is opened and closed. A stop 53' is seated against an abutment 55 formed on the base of the push button whereby movement of the contact disc is limited when the switch is moved from closed to open position as shown in Figure VIII. Interposed between the depressed extremity 51 of the contact member 50 and the contact disc 53 is a spring 55' for holding said disc in spaced relation to the contact portions 46 and 50 and also for yieldingly holding the disc in engagement with the disc 56 which is superimposed upon said contact disc and rotatably mounted upon the pin 52 as shown in Figure VII. The disc 56 is provided with a central upstanding tubular projection 56' into which said pin projects, said projection having its upper end seated upon the inner wall of the upper push button member 36 upon which the projection is adapted to rotate when the disc 56 is rotated by means of the arm or lever 57 carried thereby, said arm being provided at its outer extremity with a button or knob 58 as shown in Figure VII. The lever or arm 57 extends outwardly from the push button through a slot 59 in the wall thereof to a position convenient to the fingers of the operator when his hand is in position to sound the horn or signal.

It will be noted that the contact disc 53 is provided upon its upper face with two sets of circular depressions 60 and 61 in staggered relation and spaced at equal distances from the center of the disc as shown in Figure IX. The superimposed disc 56 carrying the lever 57 is provided on its bottom side with two convex bead like projections 62 adapted to rest in one or the other of the two sets of circular depressions 60 and 61 when said lever is moved to its extreme positions of adjustment, as indicated in Figures V and VIII. When the lever is in the position shown in Figure V, the beads or projections 62 lie within the depressions 60 and when said lever is in the opposite position as shown in Figure VIII said projections lie within the depressions 61. In moving the lever from one position to another the contact disc 53 is automatically actuated after the lever has been moved substantially the full amount in either direction. The contact disc 53 begins to move at the moment when the beads or projections on the upper disc enter the depressions on the lower disc. At such time the lower disc is quickly kicked over to engage either the contact member 47 or the stop 53', depending upon the direction in which the lever is being moved. Movement of the contact disc in this manner is due to the pressure of the spring 55' becoming suddenly relieved, to a certain extent, when the beads on the upper disc move into the concave depressions on the lower disc, whereby the upper inclined member moves upon the lower to effect movement of the same when a certain amount of the pressure between the discs is relieved, by decreasing the pressure on the spring. Such an arrangement serves also to normally hold the segmental portion 54 of the lower disc in engagement with the contact member 47 so that perfect contact will at all times be insured.

Normally, when the lights are burning bright, the dimming switch is in closed position as shown in Figure V, at which time current will flow from the battery through wires 35, 34, 63, switch 21, wire 41, dimming switch 64, wires 42 and 65 to headlights 17 and thence to "ground". When the dimming switch 64 is open, the circuit will be completed through the resistance 66, whereby the reduction in the intensity of the light is effected.

While I have described my invention in more or less detail and as being embodied in certain precise forms, I do not desire or intend to be limited thereto, but on the contrary the invention contemplates broadly all proper changes, both in the omission of immaterial elements and the substitution of equivalents therefor, as circumstances may suggest or conditions render expedient.

What I claim as new and desire to secure by Letters Patent is:

1. In combination, a switch operating push button, and a circuit controlling switch, both contacts of which are mounted within and bodily movable with said push button, said last-named switch having an operating lever extending laterally therefrom movable in a plane at right angles to the direction of movement of said push button.

2. In combination, a motor vehicle steering column, a signal switch mounted within said column, a push button therefor mounted on the end of said column and a lighting switch carried entirely by said push button having an operating arm extending laterally thereof.

3. In combination, a motor vehicle steering column, a signal switch mounted therein, a push button for said switch carried by said column, means to prevent relative rotation between said column and said push button, a second switch comprising stationary and rotatable contact members mounted in said push button and a handle for moving said rotatable contact member.

In testimony whereof, I affix my signature.

HENRY A. WAGNER.